E. W. SMITH.
ELECTRIC STORAGE BATTERY NEGATIVE POLE PLATE.
APPLICATION FILED MAY 19, 1905.

1,085,707.  Patented Feb. 3, 1914.

UNITED STATES PATENT OFFICE.

EDWARD WANTON SMITH, OF PHILADELPHIA, PENNSYLVANIA.

ELECTRIC-STORAGE-BATTERY NEGATIVE-POLE PLATE.

1,085,707.  Specification of Letters Patent.  Patented Feb. 3, 1914.

Application filed May 19, 1905.  Serial No. 261,118.

*To all whom it may concern:*

Be it known that I, EDWARD WANTON SMITH, a citizen of the United States, residing at the city of Philadelphia, in the county of Philadelphia and State of Pennsylvania, have invented certain new and useful Improvements in Electric-Storage-Battery Negative-Pole Plates, of which the following is a specification.

Objects of the invention are to provide negative pole plate active material of comparatively great durability; to impart to negative pole plate active material without change in the bulk or over all dimensions thereof and without bringing the active mass into a state of compression, the quality of maintaining its capacity and porosity throughout a long life, and to obtain the advantages which result from initially completely filling the recesses, boxes or cavities which are provided in the negative pole plate grid for its reception with active material or material to become active of such character that it attains the requisite loose structure without exerting undue pressure upon the grid or support and without becoming consolidated.

To these and other ends hereinafter set forth the invention stated in general terms comprises the improvements to be presently described and finally claimed.

The nature, characteristic features and scope of the invention will be more fully understood from the following description taken in connection with the accompanying drawings forming part hereof and in which—

Figure 1:
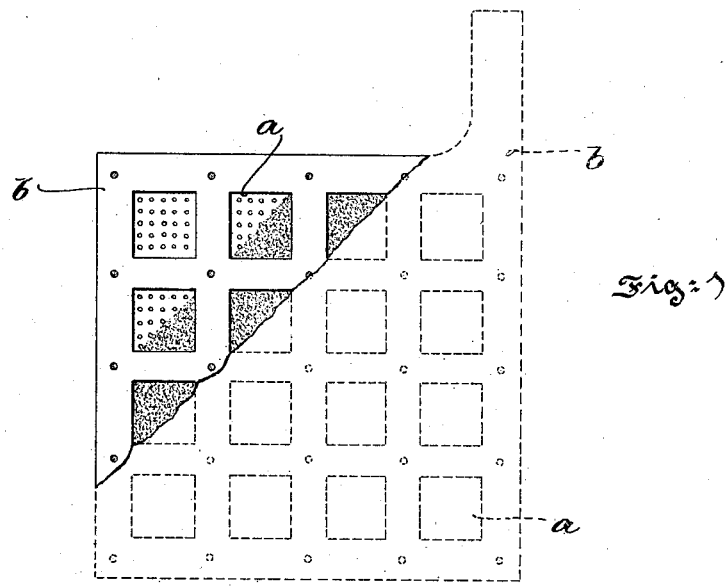
Figures 2, 3:
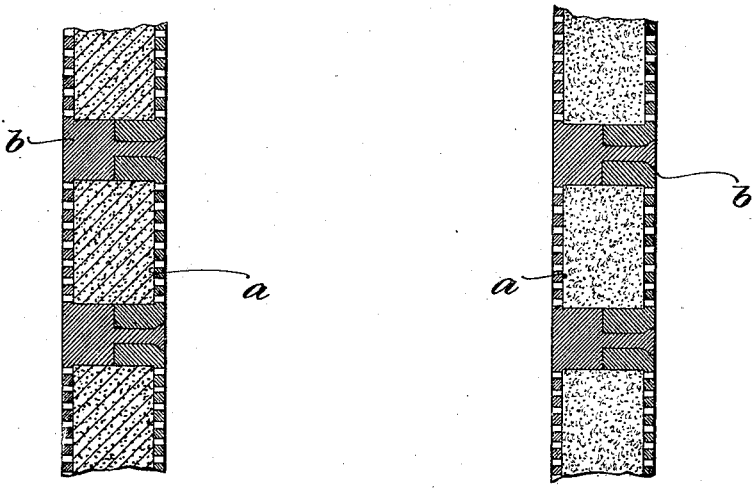

Figure 1, is an elevational view partly broken away illustrating a negative pole plate provided with box-like receptacles which are initially filled with the novel active material. Fig. 2, is a sectional view of a plate diagrammatically illustrating pellets of the novel active material before being reduced to the metallic state and discharged, and Fig. 3, is a similar view illustrating the active material after reduction, showing that the bulk has not increased.

The negative pole plate active material or material to become active comprises a mixture of inert material in a state of extreme sub-division, such as an impalpable powder and very porous lead or a lead compound which upon reduction produces very porous lead in the sense that it occupies a comparatively large volume in proportion to its weight. Very finely divided lamp black is an example of such inert material, and as examples of lead compounds which occupy a comparatively large volume in proportion to their weight, and which upon reduction will produce very porous lead, the following may be mentioned: Orange mineral, *i. e.*, roasted lead carbonate. Lead carbonate or a mixture of same with lead oxid of any kind. Hydrated lead oxid or a mixture of same with lead oxid of any kind. The product derived from lead subjected to attrition in water and to the action of air. Or a mixture of any such compounds. The last mentioned product consists of a lead compound or oxidized lead, and it may be manufactured by first producing granular lead, for example, by pouring melted lead into a jet of steam, and then placing the resulting granular lead along with water into a rotating cylinder through which air may be made to circulate so that the particles or granules of lead grind upon themselves while subjected to the action of air and water. As a result the water becomes milky and is drawn off and filtered and the residue constitutes a product which gives satisfactory results. The nature of the product may be described by stating that its specific gravity is approximately 60 to 75% of that of ordinary litharge. The specific gravity of the product is a guide in determining how far the process is to be continued.

One to five per cent. by weight of the inert material and 99 to 95% by weight of the lead or lead compound is an illustration of proportions which are productive of good results. When the described negative pole plate active material or material adapted to become active is subjected to electrolytic reduction and discharge, it tends to grow and become of a more loose structure, but whatever tendency there is for it to grow and become more porous is compensated for by reason of its initially relatively large volume, so that there is neither compression of the mass or pressure upon the grid, the latter serving merely to prevent the mass from falling apart, and thus a loose structure is maintained without increase of bulk.

Since there is, during the electrolytic process, no increase of bulk, the box-like receptacles *a*, of the grid or support *b*, are initially and remain completely filled with the described negative pole plate active material or material adapted to become active which is obviously advantageous, and since the material is not dense enough to be brought into a state of compression there is no need to employ such a heavy grid as would be required if the material were dense and had to be maintained in a state of compression. The receptacles $a$, may of course be initially completely filled with the described active material prior to its subjection to electrolytic action, so that they can be completely filled with the described mixture of inert material and lead compound which can be reduced *in situ* to the metallic state and discharged, or the lead of loose structure such as can be produced by the expansive action of an admixture of inert material can be first prepared by electrolysis and then placed in the receptacles, boxes or pockets $a$, in such a way as to initially fill them. Since the pockets are completely filled with a mixture of inert and described active material and contain no empty space or soluble matter for producing such space, it follows that the material may not grow in bulk and since the material is not dense it is not brought into a state of compression, it therefore always is of substantially uniform consistency throughout its mass.

It will be obvious to those skilled in the art to which my invention relates that modifications may be made in details without departing from the spirit thereof, hence the invention is not limited further than the prior state of the art may require, but

Having thus described the nature and objects of my invention what I claim as new and desire to secure by Letters Patent is—

1. Negative pole plate active material consisting of a mass of non-fibrous inert material capable of expanding ordinary lead active material and in a state of extreme sub-division like an impalpable powder, and a finely divided lead compound derived from the attrition of lead with water, substantially as described.

2. A negative pole plate consisting of the combination of a grid having box-like cavities and a mass completely filling said cavities and comprising a mixture of non-fibrous inert material capable of expanding ordinary oxids of lead and in a state of extreme sub-division like an impalpable powder and a finely divided lead compound having larger specific volume than ordinary oxids of lead, whereby although the cavities are initially filled the mixture does not increase in bulk and tend to exert pressure, substantially as described.

In witness whereof I have hereunto signed my name.

EDWARD WANTON SMITH.

Witnesses:
 W. J. JACKSON,
 K. M. GILLIGAN.